United States Patent [19]
Cavenar

[11] 3,923,157
[45] Dec. 2, 1975

[54] BAR HANDLING AND LENGTH DETERMINING APPARATUS

[75] Inventor: Clarence W. Cavenar, Del City, Okla.

[73] Assignee: W & Steel Co., Oklahoma City, Okla.

[22] Filed: July 17, 1974

[21] Appl. No.: 489,107

[52] U.S. Cl. .................. 209/73; 209/74 R; 209/82; 83/419; 83/468
[51] Int. Cl.² .......................................... B07C 5/04
[58] Field of Search ......... 209/73, 74, 82, 122, 124, 209/125, 126; 83/268, 269, 391, 419, 467, 468; 214/1 P; 198/88, 117

[56] References Cited
UNITED STATES PATENTS

| | | | |
|---|---|---|---|
| 2,322,655 | 6/1943 | Morgan | 209/122 X |
| 3,141,367 | 7/1964 | Keener et al. | 83/268 X |
| 3,370,494 | 2/1968 | Schenck | 83/269 X |
| 3,577,829 | 5/1971 | Hurn | 83/419 X |

*Primary Examiner*—Robert B. Reeves
*Assistant Examiner*—Joseph J. Rolla
*Attorney, Agent, or Firm*—Dunlap & Codding

[57] ABSTRACT

A bar handling and length determining apparatus co-operating with a bar shearing machine to cut predetermined lengths of bar stock, the apparatus comprising a powered conveyor apparatus rollingly supported on a frame track for striking engagement with strike members positionable at predetermined distances along the conveyor's path. Disposed between the conveyor rollers at predetermined intervals are bar stop members selectively positionable in the path of the bar moved by the conveyor rollers. The combination of a selected bar stop member and a selected strike member determines the length of the bar from a determined point. Removal from the conveyor assembly is effected by pivotable lift arms located along the conveyor assembly, the lift arms selectively lifting the bar and sliding same into a selected bin alongside the conveyor assembly.

5 Claims, 7 Drawing Figures

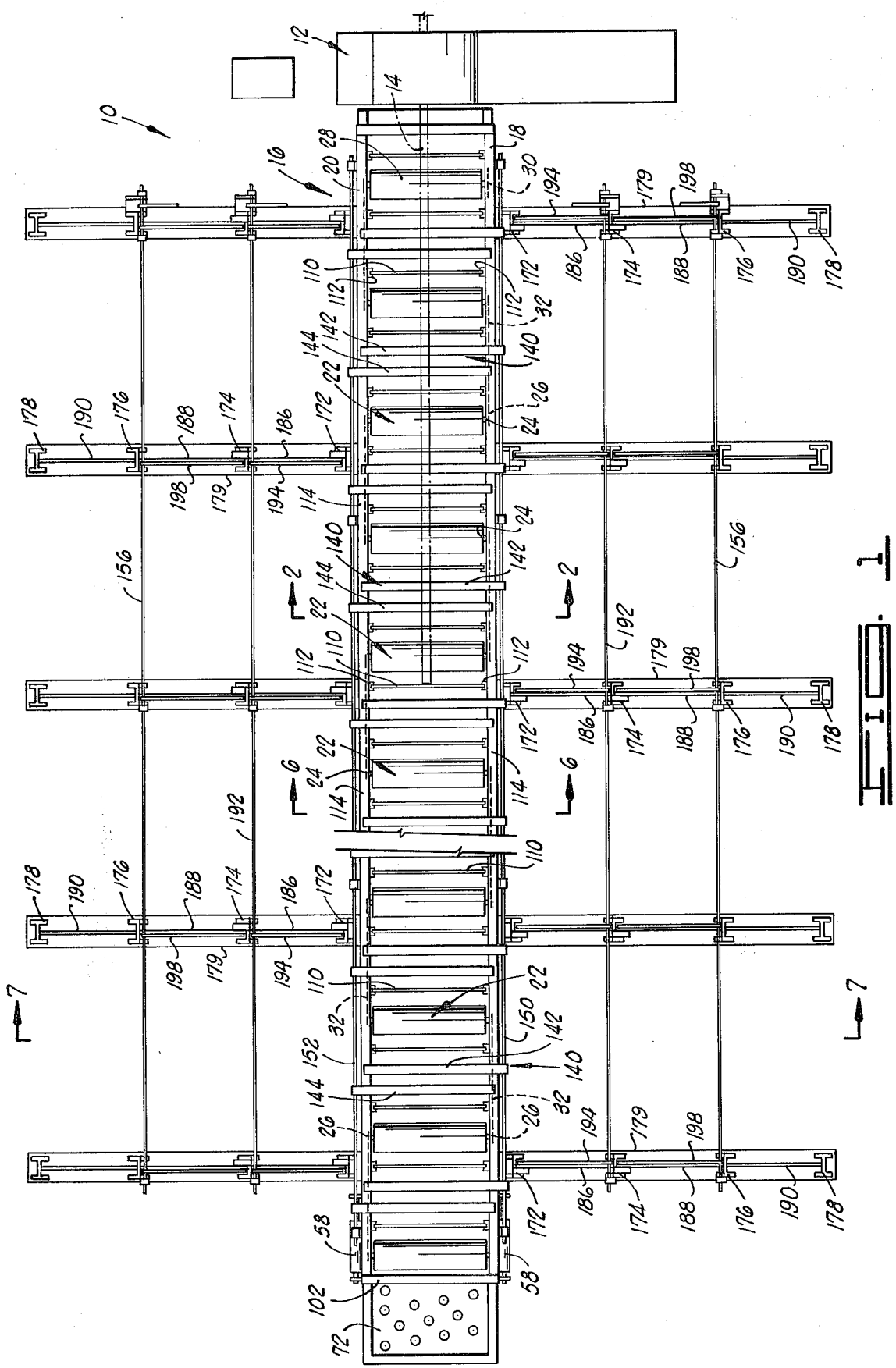

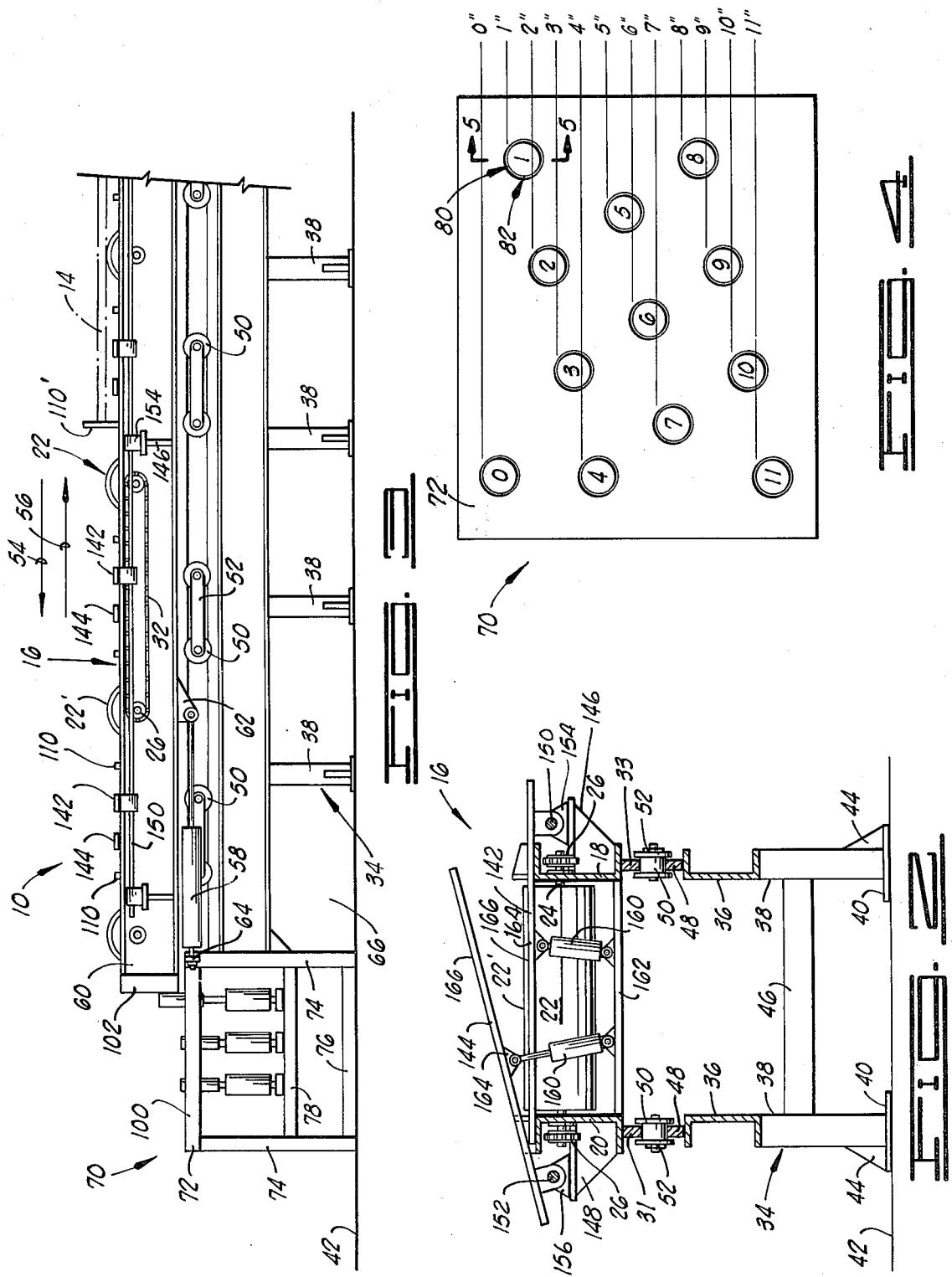

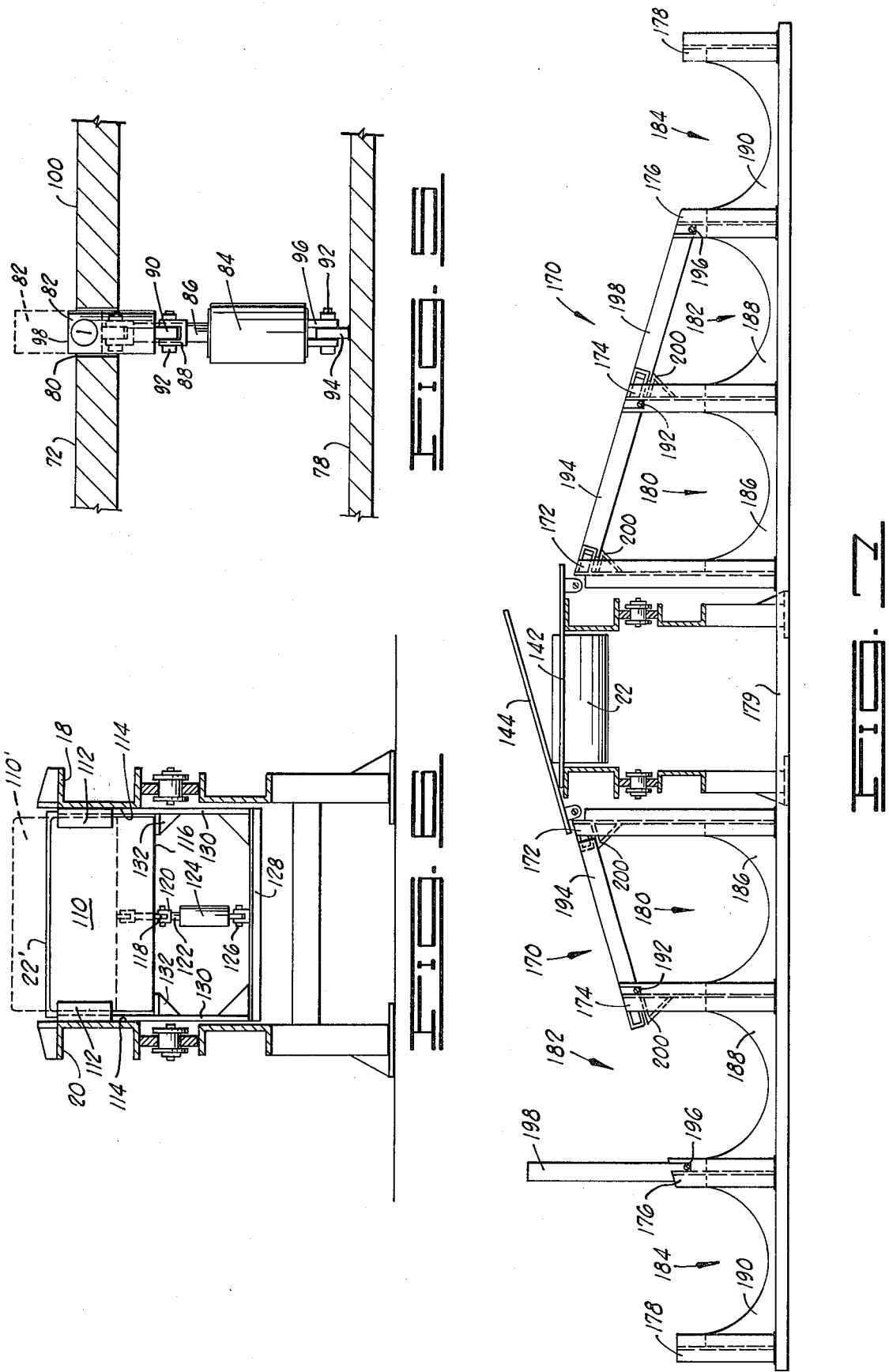

BAR HANDLING AND LENGTH DETERMINING APPARATUS

BACKGROUND OF THE INVENTION

1. Field of Invention

The apparatus of the present invention relates generally to the field of material handling, and more particularly, but not by way of limitation, to an apparatus for handling bar stock from a bar shearing machine.

2. Description of the Prior Art

In supplying reinforcing steel and the like to various industrial uses, it is customary for the mill to provide the bar stock in relatively long lengths, such as for example, sixty foot lengths of bar stock steel. A steel fabricator shop custom cuts these bar stock lengths into a variety of lengths, depending upon customer orders. Shearing machines have been developed that can rapidly cut the variously shaped and sized bar stock, and a number of shear assembly lines have been developed utilizing automatic feed tables and some form of an automatic bar removing table. Various techniques have been used to measure the bar stock before cutting it following which the sheared portion is deposited into selected bins. While generally acceptable, prior art material handling tables have been complex, generally slow reacting, and costly to maintain.

SUMMARY OF THE INVENTION

The present invention provides a bar handling and length determining apparatus comprising a frame having a guide track upon which is supported a power conveyor means for moving bars along a horizontal path. A conveyor strike means is selectively positionable in the path of the power conveyor means, and power means selectively move the power conveyor means in striking engagement with the conveyor strike means. Bar stop means selectively terminate the movement of the bar at a selected position on the conveyor means, and bar removal means selectively remove the bar from the conveyor means, the bar receivable by bar cradle means selectively depositing the bar in bins alongside the conveyor means.

It is a principal object of the present invention to provide a bar handling and length determining apparatus operable at a very high rate of production, the length of the bar stock being quickly selected and determined.

Another object of the present invention is to provide a bar handling and length determining apparatus affording simplicity of design and ease of manufacture.

Another object of the present invention is to provide an improved bar handling and length determining apparatus than affords efficient operation and that requires minimum maintenance.

Other objects, features and advantages of the present invention will be apparent to those skilled in the art from the following detailed description of presently preferred embodiments of the invention when taken in conjunction with the accompanying drawings.

BRIEF DESCRIPTION OF THE DRAWINGS

FIG.1 is a plan view of the bar handling and length determining apparatus of the present invention.

FIG. 2 is a cross-sectional view taken at 2—2 in FIG. 1.

FIG. 3 is a partial elevational view of the apparatus of FIG. 1.

FIG. 4 is a plan view of the conveyor strike assembly of the present invention.

FIG. 5 is a cross-sectional view taken at 5—5 in FIG. 4

FIG. 6 is a cross-sectional view taken at 6—6 in FIG. 1.

FIG. 7 is a cross-sectional view taken at 7—7 in FIG. 1 except that the slide arms 198 are shown in the raised position.

DESCRIPTION OF THE PREFERRED EMBODIMENT

Referring to the figures generally and in particular to FIG. 1, the improved bar handling and length determining apparatus of the present invention is generally designated by the numeral 10. Represented in block form is a bar shearing machine 12 which is conventional in the art, and comprises a set of blades capable of cutting a metal bar 14 that is shown extending through the machine prior to being cut. The bar 14 is usually of metal, but may be comprised of other materials for the purpose of the present invention. As was mentioned briefly above, it is the usual practice for mills to provide steel rod for reinforcing purposes in long lengths which are sent to fabricating shops that in turn custom cut the metal stock into a large number of shorter lengths. Obviously, the bar shearing machine 12 could be used by itself, and all measurements made manually. However, this would consume a large amount of labor and would raise the cost of the cut pieces prohibitively.

The bar 14 is fed through the bar shearing machine 12 in any convenient way. It is the usual pratice to provide a power conveyor to feed the bar 14 through the machine 12, but this may be done manually. In the application of the present invention to other materials that are available in roll stock, a drum feeder of conventional design may be used. As will become clear below, the important aspect of feeding the bar 14 to the present invention is that the bar is brought against selected stops for positive measurement from the stop to the cutting edge of the bar shearing machine.

As the bar 14 is pushed through the bar shearing machine 12 which is in an open blade mode, the bar is brought upon a power conveyor assembly 16. The power conveyor assembly 16 comprises a pair of parallel side members 18 and 20. A plurality of rollers 22 having axles 24 are bearingly mounted in appropriately aligned and mating apertures in the side members 18 and 20. The axle 24 extends through the bearinged apertures and has a chain sprocket 26 on each of its protruding ends. The first roller 28 over which the bar 14 travels is driven by means of a chain 30 connected to an electric drive motor (not shown), and all of the other rollers 22 are driven by the side chains 32 that connect the chain sprockets 26 in alternating pairs as shown in FIG. 1.

As best shown in FIG. 2, the side members 18 and 20 of the power conveyor assembly 16 have a support track edge 33 which is a rectangular metal strip welded to the bottom edge of the side members. The entire conveyor assembly 16 is supported on a frame 34 which is comprised of a pair of parallel U-beams 36 supported on a plurality of vertically disposed stanchions 38 that are welded to the base plates 40 that rest upon the floor 42. Web supports 44 brace the stanchions against sway and cross braces 46 firmly establish the distance therebetween. Welded along the top edge of the U-members 36 are the metal pieces 48 that are generally the shape of the support track edges 33 and which form a guide track for the power conveyor assembly 16. As best shown in FIG. 3, roller wheels 50 are independently disposed between the conveyor assembly 16 and the frame 34. The rollers 50 are connected in pairs by cross straps 52. The rollers 50 are grooved as shown in the cross section view of FIG. 2 and receive the support track edges 33 and the guide track 48 therein. This structure provides an independently suspended conveyor assembly 16 which is rollingly supported on the guide track 48 of the frame 34. That is, the power conveyor assembly 16 is movable in a first horizontal direction 54, which is coincident with the direction that the bar travels on the conveyor rollers 16, and the conveyor assembly is movable in a second horizontal direction 56 which is opposite to the direction 54. A pair of pneumatic rams 58 are disposed at the distal end 60 of the conveyor assembly 16 for the purpose of moving the conveyor assembly 16 in either the first horizontal direction 54 or in the second horizontal direction 56. One end of each of the double acting pneumatic rams 58 is connected to the conveyor assembly 16 at the extending member 62 connected thereto, and the other end of each pneumatic ram 58 is connected via the connector 64. The piping to the pneumatic ram 58 and to all of the other pneumatic devices in the present invention has not been shown, but it will be understood that such devices are connected to a pressure fluid source by conventional structure.

Located at the distal end 66 of the frame 34 is the conveyor strike assembly 70 comprising a top plate 72 supported by frame members 74 that are cross braced by the base member 76 and by an intermediate shelf 78. As best shown in FIG. 4, the top plate 72 of the strike conveyor assembly 70 has 12 apertures 80 designated from 0 through 11, the spacing of which are established at one inch intervals as can be seen by the extension of the tangential lines to one side thereof and which are designated in FIG. 4 from 0 inches through 11 inches at 1 inch intervals. Disposed in each of the apertures 80 is a strike member 82 as can best be shown in the cross-sectional view in FIG. 5 taken at 5—5 in FIG. 4. The strike member 82 is connected to an air cylinder 84 at its ram end 86 by means of clevice connector means 88. The strike member 82 has an apertured extending member 90 and a bolt and cotter key arrangement 92 securely connects through the apertures of the clevice 88 and the aperture of member 90. In like manner, the intermediate shelf 78 has a plurality of extending apertured ears 94, and the clevice connector end 96 is connected thereto by means of a similar bolt and cotter key arrangement 92. The aperture 80 is sized to clearingly receive the strike member 82 in a sliding relationship thereto freely permitting the strike member 82 to be positioned in an extended or striking engagement mode as shown in FIG. 5, or alternatively the strike member 82 may be withdrawn so that its top surface 98 is flush with the top surface 100 of the top plate 72.

The arrangement as described for the conveyor strike assembly 70 disposes twelve strike members 82 at 1 inch intervals as shown in FIG. 4. Appropriate control means is provided to selectively extend one of the strike members 82 (designated 0 through 11) as desired. As shown in FIG. 3, the distal end 60 of the power conveyor assembly 16 clears the surface 100 of the top plate 72 in its travel in directions 54 and 56, and is brought into striking engagement with whichever one of the strike members 82 that is raised above the surface 100. As only one of the strike members is raised at any one time, the strike members as arranged serve as a conveyor strike means to selectively stop the movement of the conveyor assembly 16 at intervals of 1 inch measured from the strike member 82 designated 0 in FIG. 4. For this purpose, a strike plate 102 is provided at the distal end 60 as a wear surface and cross member thereof.

Located along the conveyor assembly 16 at 1 foot intervals are the bar stop members 110 that are shown in the cross sectional view of FIG. 6 taken at 6—6 in FIG. 1. Each of the bar stops 110 is a rectangularly shaped panel disposed appropriately between the rollers 22 in guiding members 112 located on the inside surfaces 114 of side members 18 and 20. Protruding from the lower edge 116 of each of the bar stops 110 is an apertured extending member 118 that is connected to the clevice connector 120 connected to the ram end 122 of an air cylinder 124. The other end of the air cylinder 124 is connected via connector 126 to a cylinder support member 128 that is positioned beneath the U-members 18 and 20 by means of straps 130 connected to the inside surfaces 114 of members 18 and 20. Stop members 132 project from the straps 130 for the surface 116 to rest upon when the air cylinder 124 is retracted as shown in FIG. 6. When the ram end 122 of air cylinder 124 is extended as shown in dashed outline in FIG. 6, the bar stop member 110 is projected above the roller 24 as shown at 110'. As will be made clear below, the bar stop member in position 110' serves to stop the travel of the bar 14 as it is caused to travel in the first horizontal direction 54 by the action of the driven conveyor rollers 22.

Bar removal means 140 is provided to lift the cut bars from the conveyor rollers and to slide them to either side of the conveyor assembly 16. The bar removal means comprises a plurality of lift bars 142 and 144 that are inter-disposed between the rollers 22 and the bar stop members 110 along the conveyor assembly 16. FIG. 2, a cross-sectional view taken at 2—2 in FIG. 1, shows the lift bars 142 and 144 pivotally connected to opposite sides of the conveyor assembly 16. The protruding members 146 and 148 extend from the U-members 18 and 20, respectively. All of the lift arms 142 are connected to a pivot bar 150, and all of the lift arms 144 are connected to a pivot bar 152 disposed on the other side of the conveyor 16. The pivot bar 150 is bearingly mounted to the protruding members 146 by appropriate bearing apertures in a protrusion tab 154 extending from the member 146. In like manner the pivot bar 152 is bearingly mounted to protrusion tab 156 extending from the member 148. In this connecting manner, all of the lift arms 144 are positionable in a lifting mode as depicted in FIG. 2, and in like manner, all of the lift arms 142 are positionable in a lifting mode upon turning of bar 150. Air cylinders 160 are provided at intervals along the conveyor assembly 16 and are connected to a cross strap 162 extending from the bottom of U-member 18 to the comparable location on U-member 20, the other ends of the cylinders 160 being connected to a protrusion tab 164 on the underside of the lift arm 142. That is, several of the lift arms 142 are provided with the air cylinders 160 that act in unison to extend so as to pivot the lift arms 142 and consequently turn the pivot bar 150, thereby lifting all of the lift arms 142. In like manner, appropriately spaced air cylinders are connected to lift arms 144 to raise all of the lift arms 144 in unison with the pivoting of pivot bar 152. When the lift arms 142 and 144 are in the rest position, or retract mode, as depicted by the lift arm 142 in FIG. 2, the under surfaces of the lift arms rest on the top surface of the U-members 18 and 20, and the top surfaces 166 are disposed below the rolling surface 22' upon which the bar 14 is transported over conveyor assembly 16.

As will become clear below, the lift bars 142 and 144 are selectively positionable in the raised or pivoted mode such that the bar 14 following its cleavage by the bar shearing machine from the feed stock can be disposed to either side of the conveyor assembly 16 as desired. With the lifting of the selected lift arms, the bar slides to one side of the conveyor 16 where it further slides selectively upon slide arms that cover the bins alongside conveyor 16 in a manner more clearly shown in FIG. 7.

Located alongside conveyor 16 on each side thereof is a bar cradle assembly 170. Each bar cradle assembly 170 comprises a row of stanchions 172, 174, 176 and 178 carried by base element 179 and extending from the floor 42 in a line normal to the length of the conveyor 16, rows of the stanchions placed at intervals alongside the conveyor 16. These stanchions form a bin 180, a bin 182, and a bin 184 into which the bars can fall as they are removed from the conveyor 16. An arcuate member 186 is provided at the bottom of the bin 180 and is connected to the stanchions 172 and 174. In like manner, the arcuate members 188 and 190 are provided respectively between the stanchions 174 and 176 and the stanchions 176 and 178. The arcuate members 186, 188 and 190 serve to keep the cut bars 14 off of floor 42 and provide clearance under the bars for the purpose of easily placing a chain or the like about the cut bars 14 for lifting the bars out of the bins by an overhead crane or the like.

Extending generally the length of the conveyor 16 is a pivot bar 192 that is pivotally supported in slots in the upper end of each of the stanchions 174. Located at each of the stanchions 174 is a slide arm 194 secured to the pivot bar 192 and extending to rest upon the stanchion 172 in the down mode, and having a lifting mode wherein all of the arms 194 are raised to uncover the bin 180. In like manner, a pivot bar 196 extends generally the length of the conveyor 16 and is bearingly supported for pivotation in the slots in the upper ends of the stanchions 176. Located at each of the stanchions 176 is a slide arm 198 that extends from the stanchion 176 to rest on the stanchion 174, having a down mode and a lift mode as described for slide arms 194. Extension stops 200 are provided on the stanchions 172 and 174 to provide rest stops for the slide arms 194 and 198 when the slide arms are in the down mode. It should be noted that the height of the stanchions are proportioned so that the slide arms 194 and 198 provide a slide track extending from the top of stanchion 172 to the stanchion 176 and consequently to the bin 184 when the slide arms 194 and 198 are in the down mode. In FIG. 7, the lift arms 144 are in the raised position, so that the rod 14 would slide from the pivoted lift arms 144 to the slide arms 194, and will continue down the slide arms 194 to fall into the bin 182 shown opened on one side of the conveyor assembly 16 by the positioning of one set of the slide arms 198 in the lifting mode as shown. Appropriately placed air cylinders (not shown) cause the selective pivotation of each set of the slide arms 194 and 198 to their lift mode as desired by the operator of the apparatus of the present invention. It will be clear that the bar or bars 14 will continue to slide down the slide arms 194 and 198 to come to rest in the bin 184 if the slide arms 194 and 198 are in the down position so as to cover the bins 180 and 182. With the raising of the slide arms 198, it is clear that the bar or bars 14 will slide down slide arm 194 and come to rest in the bins 182. Also, it is clear that the bars will fall from the lift arms into the bin 180 if the slide arms 194 are positioned in the lift mode. Therefore, the bars 14 may be removed from the conveyor assembly 16 on either side thereof and positioned in the bins 180, 182 or 184 located on the takeoff side.

Although not shown in the figures, guide rails are provided along the length of conveyor assembly 16 to guide the bar or bars 14 on the rollers 22. Such guide rails are conventional and have been left out of the figures so as to show other details more clearly.

A control panel, also not shown, is provided having appropriate controls, the selective actuation of which raises one of the strike members and one of the bar stop members, the combination of which represents a predetermined distance from the blades of the shearing machine 12. Of course, the conveyor assembly 16 is moved against the selected strike member, and other controls are provided to actuate the lift arms and the slide arms.

OPERATION OF THE PREFERRED EMBODIMENT

In operation of the embodiment described herein, the operator of the bar shearing machine 12 decides upon the length that the bar 14 is to be cut. He selects one of the bar stop members 110 and activates it to a lift position or mode 110' as shown in FIG. 3. The bar stop members 110 are positioned at one foot intervals along the conveyor assembly 16, and the operator selects the bar stop member 110 at the appropriate foot length that he desires bar 14 be cut. That is, each of the bars 110 is positioned a predetermined linear distance in feet from the blades of the bar shearing machine 12. Therefore, if the operator desires to cut a bar 14 some 35 feet in length, the operator would actuate the bar stop member 110 located at the 35 foot mark along the conveyor assembly 16.

If the bar 14 is to be cut in a length that does not come out to be even in linear feet measurement, the operator selects and actuates the appropriate strike member 32 located in inch increments in the conveyor strike assembly 70. That is, if the operator desires to cut the bar 14 to a length of 35 feet, 8 inches, the operator would further actuate the air cylinder 84 connected to strike member 82 designated 8 in FIG. 4. This would cause the strike member designated 8 to be extended above the surface 100 of the top plate 72, as illustrated in FIG. 5 with the strike member designated 1. Once the strike member designated 8 is in position, the pneumatic ram 58 is actuated to move the conveyor 16 in the direction 54 so that the strike plate 102 at the distal end of the conveyor comes into striking engagement with the elevated strike member 82, thereby stopping the movement of the conveyor 16 in the direction 54 and holding the conveyor in that position.

Now that the appropriate stop member (at 35 feet) and the appropriate inch strike member (the strike member 82 designated 8) are elevated, the bar stop 110 at the 35 feet position will be 35 feet and 8 inches from the cutter blade of the bar shearing machine 12. The operator then causes the feed stock to be pushed through the bar shear machine 12 and onto the conveyor assembly 16 whereupon the driven rollers 22 cause the feed stock to butt up against the appropriately raised bar stop member 110. The operator then actuates the shearing action of the bar shearing machine 12, cutting bar 14 from the feed stock.

At this time, the operator can use the action of the conveyor assembly to place the bar 14 at any position along its length by lowering the length determining bar stop member 110 and permitting the cut bar 14 to continue its travel upon the driven rollers 22 to strike another raised bar stop member of the operator's choice whereupon the lift arms 142 or 144 are pivoted by the actuation of the appropriate air cylinders 160 to slide the cut bar 14 to a selected side of the conveyor 16. Of course, the operator need not move the bar 14 to a new position prior to lifting it off of the conveyor 16, but this is discussed for the purpose to describe his wide option of operation.

The bar 14 following its cut can be placed in any of the bins 180, 182 or 184 positioned on either side of conveyor assembly 16 by means of actuating the appropriate slide arms 194 or 198 in the manner described above.

Thus it is clear that the embodiment of the bar handling and length determining apparatus described herein is capable of meeting all of the objects above enumerated, and while the invention has been particularly shown and described with reference to the preferred embodiment described herein, it will be understood by those skilled in the art that various changes in form and details may be made therein without departing from the spirit and scope of the invention.

What is claimed is:

1. A bar handling and length determining apparatus, comprising:
   a frame having a guide track;
   a conveyor assembly comprising:
   an elongated first side member having a first support track edge, and a plurality of in-line apertures;
   an elongated second side member having a second track support edge, the second side member disposed in spaced-apart parallel relationship to the first side member and having a plurality of in-line apertures, each aperture matingly aligned with one of the apertures of the first side member;
   a plurality of rollers disposed between the first and second side members, each roller having an axle bearingly mounted in an aperture of the first side member and the mating aperture of the second side member;
   rotating means rotating the rollers for moving bars along a path in the first direction; and,
   a strike plate;
   roller means disposed between the guide track of the frame and the support track edges of the first and second side members rollingly supporting the conveyor for movement in a first direction and in a second direction opposite to the first direction;
   a plurality of strike members reciprocatingly positionable in striking engagement with the strike plate, the strike members disposed at predetermined spaced-apart distances for selective positioning in the path of the strike plate for terminating movement of the power conveyor assembly in the first direction;
   select means positioning a selected strike member in the path of the strike plate;
   power means selectively moving the conveyor assembly in the first direction toward the strike members, and in the second direction away from the strike members;
   bar stop means selectively terminating movement of the bar in the first direction; and,
   bar removal means selectively removing the bar from the conveyor assembly.

2. The apparatus of claim 1 wherein the power means comprises:
   an extendable power cylinder having one end connected to the conveyor assembly and the other end connected to the frame; and,
   pneumatic means for selectively extending the power cylinder.

3. The apparatus of claim 2 wherein the bar stop means comprises:
   a plurality of bar stop members connected to the conveyor assembly and disposed at predetermined distances therealong, each bar stop member being selectively positionable in the path of the bar moved by the conveyor assembly; and,
   bar stop positioning means positioning a selected bar stop member in the path of the bar.

4. The apparatus of claim 3 wherein the bar removal means comprises:
   a plurality of lift arms pivotally supported by the conveyor assembly at predetermined distances therealong having a retract mode wherein the lift arms are in clearing relationship to the bar on the conveyor assembly and a lifting mode wherein the lift arms are selectively pivotable to raise the bar from the rollers; and,
   means for selectively pivoting the lift arms between the retract mode and the lifting mode.

5. The apparatus of claim 4 further comprising a bar cradle comprising:
   a plurality of stanchions positioned alongside of the conveyor assembly in lines normal thereto, the stanchions defining a plurality of bins therebetween and generally parallel to the conveyor assembly; and,
   a plurality of slide arms pivotally extending from the stanchions and cooperating to form a slide track with the lift arms in the lifting mode, the slide arms covering the bins in a down mode, and the slide arms selectively covering or opening the bins for bar admission thereto; and,
   slide arm power means selectively positioning the slide arms to cover or open the bins.

* * * * *